(12) United States Patent
Tanten et al.

(10) Patent No.: US 6,486,648 B1
(45) Date of Patent: Nov. 26, 2002

(54) ELECTRONIC CIRCUIT INCLUDING AN ANALOG OUTPUT THROUGH WHICH AN ADJUSTMENT MEANS IS PROGRAMMED

(75) Inventors: Leo Tanten; Bernhard Opitz, both of Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/701,847

(22) PCT Filed: Apr. 1, 1999

(86) PCT No.: PCT/DE99/00985

§ 371 (c)(1),
(2), (4) Date: Dec. 4, 2000

(87) PCT Pub. No.: WO99/64824

PCT Pub. Date: Dec. 16, 1999

(30) Foreign Application Priority Data

Jun. 5, 1998 (DE) .......................................... 198 25 159

(51) Int. Cl.[7] .......................... G01R 19/00; G01R 1/02; G01D 18/00
(52) U.S. Cl. ...................... 324/76.11; 324/130; 326/32; 702/85
(58) Field of Search ....................... 324/74, 130, 76.11; 702/85; 326/32

(56) References Cited

U.S. PATENT DOCUMENTS

| | | | | |
|---|---|---|---|---|
| 3,751,681 A | * | 8/1973 | Jordan | 326/26 |
| 4,099,240 A | * | 7/1978 | Rode et al. | 702/85 |
| 4,218,746 A | * | 8/1980 | Koshiishi | 205/789 |
| 4,366,541 A | * | 12/1982 | Mouri et al. | 701/103 |
| 4,949,029 A | * | 8/1990 | Cooper et al. | 324/74 |
| 5,568,047 A | * | 10/1996 | Staver et al. | 324/127 |
| 5,796,298 A | * | 8/1998 | Kearney et al. | 327/561 |

FOREIGN PATENT DOCUMENTS

| | | |
|---|---|---|
| DE | 40 24 402 | 10/1991 |
| GB | 2 218 213 | 11/1989 |

* cited by examiner

*Primary Examiner*—N. Le
*Assistant Examiner*—Anjan K. Deb
(74) *Attorney, Agent, or Firm*—Kenyon & Kenyon

(57) ABSTRACT

A circuit for evaluating electrical signals having a programmable adjustment is described. The circuit includes an analog output for signals that have been evaluated which can be used to program the adjustment.

7 Claims, 3 Drawing Sheets

ELECTRONIC CIRCUIT INCLUDING AN ANALOG OUTPUT THROUGH WHICH AN ADJUSTMENT MEANS IS PROGRAMMED

FIELD OF THE INVENTION

The present invention relates to a circuit, a programming device and a programming method.

Sensor evaluation circuits include adjustment means. After the measuring transducer has been mated with the evaluation circuit, the adjustment means are programmed by storing specific quantities, e.g., offsets, amplifications and temperature coefficients, so as to compensate for manufacturing tolerances and temperature changes in the measuring transducer with which it is mated. At the end of the production line, this data is loaded into the memory provided for this purpose via separate interfaces. Separate interfaces require expensive extra contacts on the housing of the evaluation circuit and, respectively, of the sensor element that has been mated with the evaluation circuit, and these must be protected to allow use in the field, in particular to ensure that they are properly protected against electromagnetic interference.

SUMMARY OF THE INVENTION

By contrast, the circuit, the programming device and the method according to the present invention allow straightforward adjustment of sensor evaluation circuits, in particular sensor evaluation circuits for applications in motor vehicles, to be carried out at the end of the production line, additional design elements (microcontrollers or, respectively, additional adjustment contacts) being unnecessary. Herein, it is advantageous that two-fold use is made of a line that is already present, namely the analog output. This sensor evaluation circuit, which can be adjusted in a simple manner, can be used in particular for sensors which only have an analog three-wire interface. Furthermore, the circuit according to the present invention is downwards-compatible to control units which are already present and which perform further evaluation of the output signals of sensor evaluation circuits; in the case of such control units, no changes with respect to an analog output of a three-wire interface used in straightforward manner are necessary (the three-wire interface includes a ground terminal, a supply voltage terminal and an analog output).

It is particularly advantageous that three-fold use can be made of the analog output of the sensor evaluation circuit, in that it is ensured that a memory element can be programmed, and also an external programming device can be synchronized with the adjustment means via the analog output.

It is particularly advantageous that four-fold use can be made of the analog output of the three-wire interface. This means a significant simplification of the design of the housing and printed circuit board. Furthermore, there is no need for components such as capacitors that would otherwise be necessary to prevent electromagnetic compatibility problems arising from spurious irradiation of programming connections that would otherwise also be necessary. In addition chip space can be saved, as there is no need for additional bondlouds or electrostatic shielding structures for additional programming lines that would otherwise be necessary.

DETAILED DESCRIPTION

Figure 1:
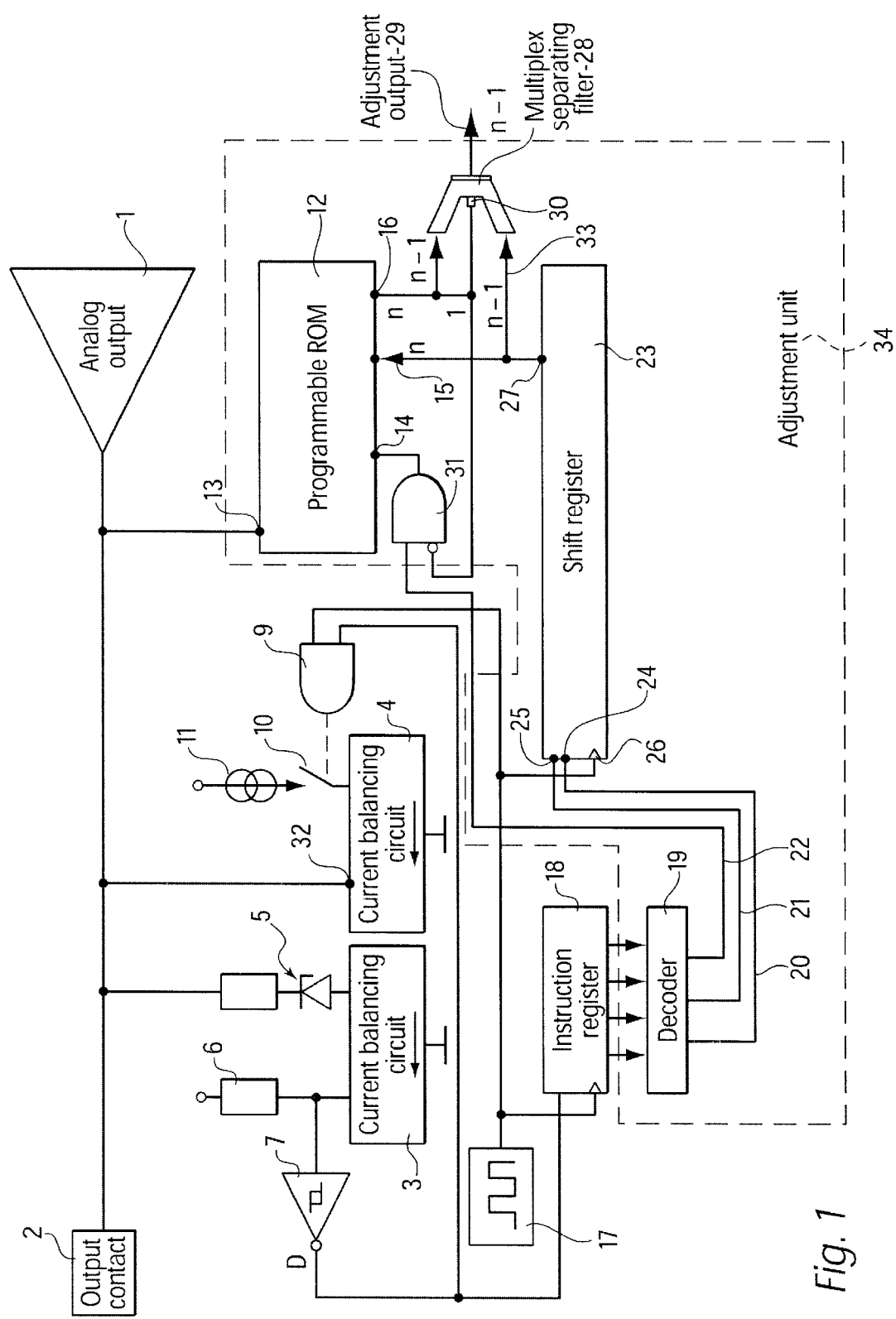
FIG. 1 shows a circuit where four-fold use is made of an analog circuit according to the present invention.

FIG. 1 shows a section of a sensor evaluation circuit having a programmable adjustment unit 34. Adjustment unit 34 is connected via adjustment output 29 to the part of the evaluation circuit which corrects the analog raw signals of a measuring transducer connected to the evaluation circuit. Analog output 1 of the sensor evaluation circuit is connected to an output contact 2. Analog output 1 supplies, for example, signals having a voltage range of between 0 and 5 volts and is short-circuit-proof with respect to the positive pole of the, for example, 16-volt voltage supply. The circuit has a bit transfer unit which includes circuit elements, 3, 5, 6, 7 and 18. The series circuit of a resistor having a Zener diode which is connected in the reverse direction is arranged in the input path of a first current balancing circuit 3, which is in turn connected to ground. The output of first current balancing circuit 3 is connected via resistor 6 to the voltage supply, a voltage pick-off, which is connected to the input of Schmitt trigger circuit 7, is arranged between current balancing circuit 3 and the resistor. Inverted output D of Schmitt trigger 7 is connected to the input of a 4-bit instruction register 18, which is designed as a shift register. A clock pulse generator 17 is connected to the clock input of instruction register 18. Analog output 1 is also connected to output 32 of a second current balancing circuit 4, whose input is connected to the voltage supply via a switch 10 and a current source 11, which is connected in series. Switch 10 is addressed by the output of an AND gate 9, the first input of AND gate 9 being connected to output D of Schmitt trigger 7 and the second input being connected to clock pulse generator 17. Analog output 1 is also connected to programming voltage input 13 of a programmable read-only memory 12, for example a PROM. The four outputs of instruction register 18 are connected to an instruction decoder 19, which has first, second and third instruction outputs 20, 21 and 22. First instruction output 20 is connected to shift-0 input 24 of an n-bit shift register 23; similarly second instruction output 21 is connected to shift-1 input 25 of shift register 23. Clock input 26 of shift register 23 is connected to clock pulse generator 17. n-bit pick-off 27 of shift register 23 is connected via an n-bit data line to n-bit input 15 of read-only memory 12. Activation input 14 of read-only memory 12 is connected to the output of a second AND gate 31, whose non-inverted input is connected to third instruction output 22. n-bit output 16 of read-only memory 12 is connected to an n-bit data line, the (n–1)-least-significant-bit lines being connected to the first input of a multiplex separating filter 28. The most significant bit of the n-bit data line is connected to the inverted input of second AND gate 31 and also to control input 30 of multiplex separating filter 28. The second input of multiplex separating filter 28 is connected via test operation path 33 to the (n–1)-least-significant-bit connectors of n-bit pick-off 27 of register 23. The output of multiplex separating filter 28 is connected to adjustment compensation 29 and includes n–1 lines.

If signal output 1 is not loaded or is short-circuited to ground via output contact 2, a digital 0 is present at output D of Schmitt trigger 7; if signal output 1 is pulled to a potential of, for example, >12 volts via output contact 2, a digital 1 is present at output D. The bit information which can be read in via output contact 2 and which is present at output D is to be read serially into shift register 18. The clock pulse information for accomplishing this is swapped between the circuit and the programming device, which is connected to output contact 2, via the clock pulse transfer unit having circuit elements 4, 9, 10, 11 and 17. When a digital 1 is present at output D, a current which has been modulated using the clock pulse and which can easily be detected in the programming unit using a suitable circuit is sent via second current balancing circuit 4 to output contact 2. With the help of a commercially available counter/timer card, the programming device can latch onto the internal clock pulse of clock pulse generator 17, i.e., the clock pulse period is measured and the phase is determined. Provided the internal clock pulse is sufficiently stable, which does not present any difficulty in the case of typical shift register clock pulse rates of between 10 and 100 kHz, the programming device is able to write synchronous data to a shift register. In the exemplary embodiment, the bit signals are loaded into 4-bit instruction register 18, i.e., a sequence of 4 bits constitutes an instruction word. Bit combination 0101 is interpreted as the instruction "shift 0"; bit combination 0110 is interpreted as the instruction "shift 1"; and bit combination 1001 is interpreted as the instruction "Program". The instructions constitute an orthogonal instruction set in that when an at least 3-pulse-long sequence of either zeroes or ones is synchronously loaded none of the three combinations occurs in 4-bit shift register 18 after one of these bit combinations. Furthermore, no other valid instruction arises on the way from a shift register that contains only zeroes or only ones to one of the three instructions. Therefore all that is required is that before and after each instruction the same logical level be present at output D for at least three consecutive clock pulses. In the case of a shift-0 instruction, decoder 19 activates first instruction output 20; in the case of a shift-1 instruction, it activates second instruction output 21; in the case of a Program instruction it activates third instruction output 22. Activation of first instruction output 20 results in a zero being synchronously loaded into n-bit-wide shift register 23; activation of second instruction output 21 results in a 1 being synchronously loaded into n-bit-wide shift register 23. During normal operation of the circuit, i.e., once read-only memory 12 has been programmed, output 16 of read-only memory 12 is connected via multiplex separating filter 28 to adjustment output 29 so that the adjustment data stored in read-only memory 12 can be used in the evaluation circuit connected to adjustment output 29 to evaluate the analog high sensor signals. However, in the case of reading-in of adjustment data described here, adjustment output 29 is still connected to output 27 of shift register 23. Therefore adjustment data that are made available to the evaluation circuit via output 29 by way of a test are read into shift register 23 via output contact 2. Thus the adjustment data in shift register 23 may still be varied iteratively by measuring the output signal via output contact 2. If the adjustment data are left unchanged, shift register 23 indicates the bits which are to be serially programmed in read-only memory 12 via, for example, Zener zapping. Test operation is achieved as follows: Provided neither the instruction shift-0 nor the instruction shift-1 is initiated, shift register 23 retains its value. The output line is put to use in the fourth manner via programming voltage input 13 of read-only memory 12; the programming power required (programming voltage and current) is made available to memory 12 via this input. For example, in cases where Zener zapping is used as the memory technology, voltages of about 25 volts and currents of several hundred milliamperes are used. This is feasible due to the fact that analog output 1 is short-circuit-proof. To avoid a situation where programming of a logical 1 via output contact 2 initiates a programming procedure, the programming procedure for read-only memory 12 is initiated by activating third instruction output 22. As the bit combination of the programming instruction which triggers activation of third instruction output 22 ends with a 1, this 1 may already be part of the programming pulse supplied by the programming device connected to output contact 2. The choice between test operation and normal operation is made via a bit stored in read-only memory 12. Unintentional reprogramming can be prevented by simultaneously using this bit to prevent initiation of a programming procedure via activation of third instruction output 22. To accomplish this, the aforementioned bit is set last. This most significant bit of the n bits of shift register 23 travels via AND gate 31 and thus as it were back across the bridge via which it reached memory 12. Furthermore, multiplex separating filter 28 is connected to the output of read-only memory 12 via control input 30.

The aforementioned bit combinations for the instructions shift-0, shift-1 and Program should be considered an example. Other instruction sets having other bit widths are also possible. If, as in the aforementioned example, the codings of each instruction contain at least two ones, synchronization between an external programming device and an electronic circuit can be accomplished not only before a data packet is transferred but also can be refreshed twice during each instruction that is transferred; this is because if a 1 is present at output D, AND gate 9 activates second current balancing circuit 4. The more bits used for coding the three instructions, the better the programmability of the circuit is armed against disruptive pulses, i.e., disruptive pulses that reach output D as digital pulses in spite of the relatively high noise ratio and low input impedance will usually have no impact, due to the redundancy of the proposed instruction set described above. Thus better use can be made of the programming procedure of adjustment means 34 than is possible with methods generally in use today.

The circuit described, which constitutes a separate section, may advantageously be embodied in monolithic integrated form, and in particular the sensor element may also be monolithically integrated with the evaluation unit.

Figure 2A:
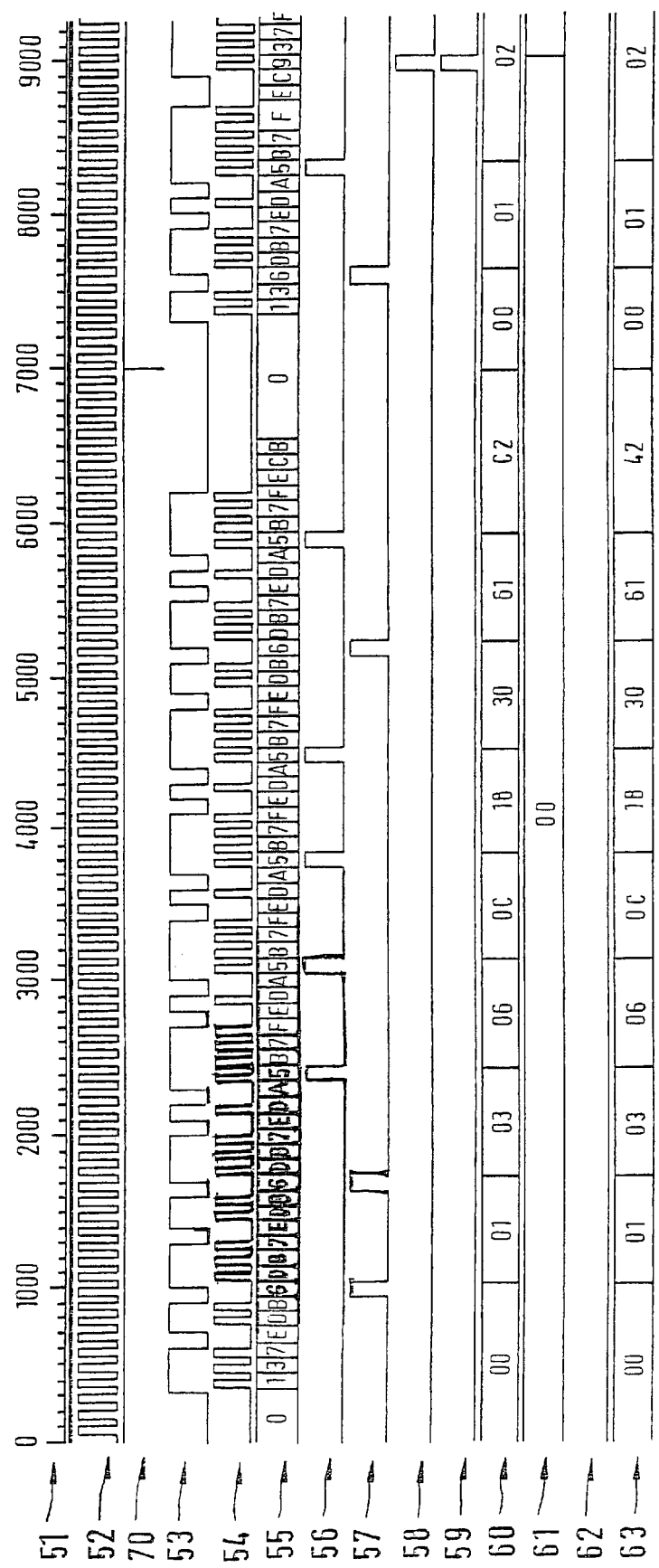
FIGS. 2a and 2b show a time chart of the programming procedure for an adjustment means according to the invention.
Figure 2B:
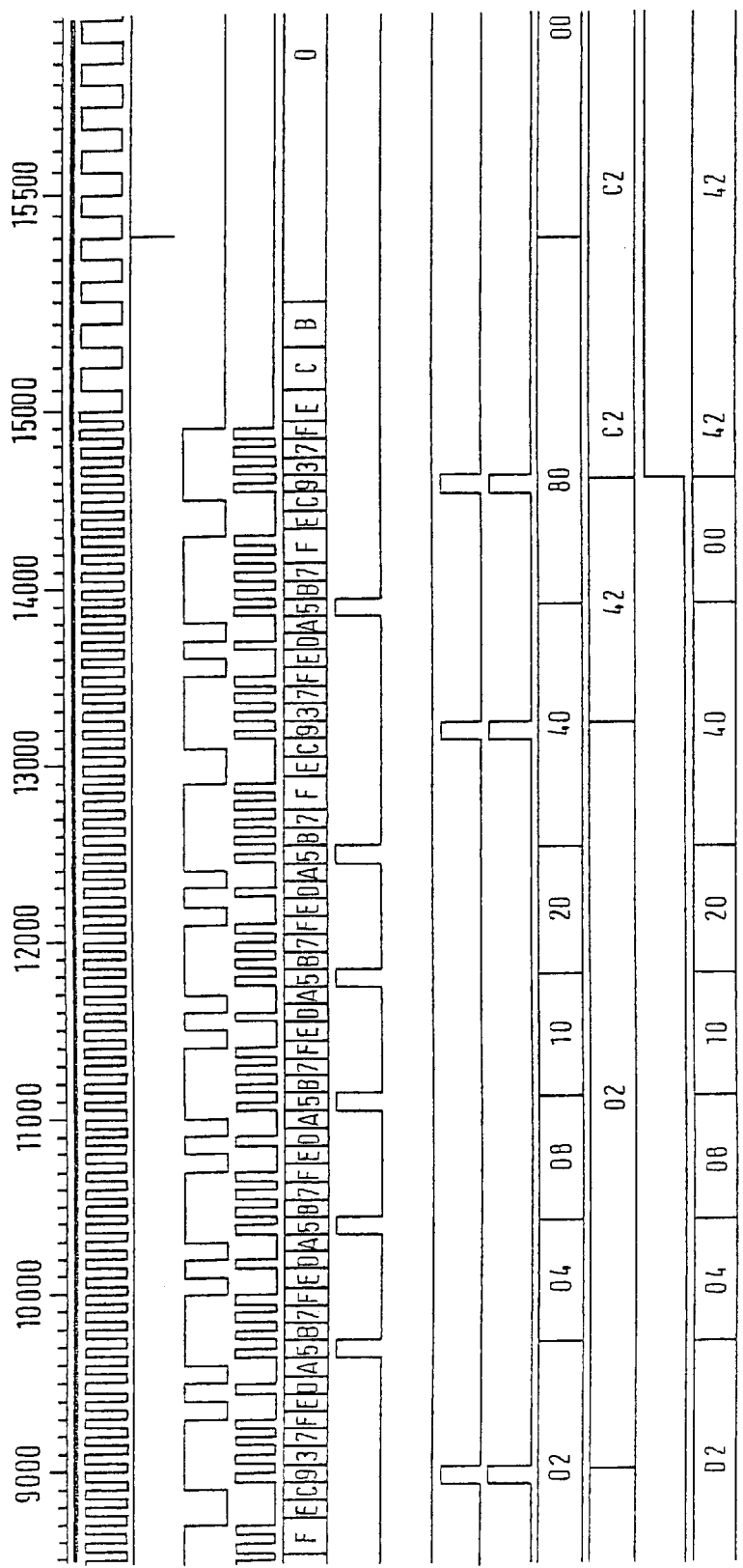

FIGS. 2a and 2b show a time chart; FIG. 2b is the continuation in time of the chart shown in FIG. 2a and partially overlaps with the chart shown in FIG. 2a. Time scale 51 is in microseconds and is slightly stretched after the 15-millisecond mark. Sequential signals are generated: clock pulse signal 52 supplied by clock pulse generator 17; a reset signal 70, which in the case of a return to the value 0 corresponds to brief switching-off of the circuit's supply voltage; bit signal 53, which is present at output D of Schmitt trigger 7; current signal 54, which is present at output 32 of second current balancing circuit 4; instruction register content 55 of shift register 18; shift-0 signal 56, which is present at first instruction output 20; shift-1 signal 57, which is present at second instruction output 21; program signal 58, which is present at third instruction output 22; activate signal 59, which is present at activation input 14 of read-only memory 12; shift register content 60 of shift register 23; stored value 61, which is stored in read-only memory 12; control signal 62, which is present at control input 30 of multiplex separating filter 28 and which corresponds to the most significant bit of stored value 61; and adjustment signal 63 which is present at adjustment output 29. In the case of the signals shown, 1-bit signals are shown in wave form, and signals that are a plurality of bits wide are indicated using hexadecimals.

In the chosen example, the value 8 has been chosen for the number n, and the 7-bit-wide adjustment information is to be the arbitrary value 1000010, which corresponds to the value 42 in hexadecimals; initially this is to be set in reversible test operation (up to point-in-time T=7 milliseconds); thereafter, in a programming sequence (from T=7 milliseconds to T=15.4 milliseconds) it is to be stored such that it is non-volatile to allow normal operation (after T=15.4 milliseconds) in the read-only memory, which is embodied as PROM. The clock pulse period is 100 microseconds, and the instruction set used is the same as that described in the description with reference to FIG. 1. After each instruction, bit signal 53 remains at 1 for three clock pulse periods to ensure that no undesired instructions are triggered. During all periods during which bit signal 53 is at 1, an external programming device that is connected to output contact 2 can detect the clock pulse from current signal 54 in order to synchronize itself. During the time period from T=0 to T=6 milliseconds, the instruction register is set twice to 6 (shift-i instruction) via bit signal 53, four times to 5 (shift-0 instruction), and then once to 6 again and once to 5 so that the bit sequence 11000010, which corresponds to C2 in hexadecimals, is pushed into shift register 23. Because control input 30 and entire contents of the as yet unprogrammed PROM are 0, adjustment output 29 shows the lowest 7 bits of shift register 23, i.e., 1000010, which corresponds to 42 in hexadecimals, as desired. This remains this way during the remainder of test operation, i.e., until the reset at point-in-time T=7 milliseconds. During programming operation (after T=8 milliseconds), a 1 and a 0 are pushed into shift register 23. Thus if shift register content 60 has the status 02, which corresponds to the bit sequence 00000010, bit no. 1 is programmed into read-only memory 12 at point-in-time T=9 milliseconds via instruction 9. After a further five zeroes, which are pushed into shift register 23, at point-in-time T=13.1 milliseconds, the value 40, which corresponds to bit sequence 01000000 is present in the shift register. A further programming instruction sets the corresponding bit no. 6 in read-only memory 12. Finally comes another 0, and bit no. 7 is programmed at point-in-time T=14.65 milliseconds. This last bit is simultaneously the selection bit that switches over the multiplex separating filter via control input 30 so that henceforward the content of the 7 least significant bits of read-only memory 12, this being the value 42 in the chosen example, is output at adjustment output 29. This is not affected by the reset at point-in-time T=15.4 milliseconds, and furthermore would not be affected if the supply voltage were switched off and then switched on again. If, during normal operation, the "Program" instruction were triggered once again, activation input 14 of read-only memory 12 would not in fact be addressed, because the selection bit stored in read-only memory 12 is at 1. This means reprogramming is impossible.

The method described in the example, where just one bit is programmed with each programming instruction, has been oriented to the requirements associated with programmable read-only memories implemented using zapping methods. In the case of other technologies, such as EPROMs or EEPROMs, a plurality of bits can be programmed in parallel, which of course means the programming procedure can be shortened.

What is claimed is:

1. A circuit for evaluating electrical signals, comprising:
an evaluation unit, including:
a short-circuit proof analog output configured to output signals that have been evaluated;
an output contact coupled to the analog output; and
an adjustment arrangement to adjust the electrical signals, including;
a memory element configured to store adjustment values, and configured to be programmed via the output contact;
a clock pulse transfer unit coupled to the output contact, the transfer unit configured to synchronize the adjustment arrangement with a programming device coupled to the output contact; and
a bit transfer unit, including:
an input coupled to the output contact; and
an output configured to assign values for storage in the memory element.

2. The circuit of claim 1, wherein the electrical signals evaluated are sensor signals.

3. The circuit of claim 1, wherein the clock pulse transfer unit includes a clock pulse generator.

4. The circuit of claim 1, wherein the memory element has a programming voltage input coupled to the output contact.

5. The circuit of claim 1, wherein the circuit is monolithically integrated.

6. The circuit of claim 1, wherein the evaluation unit is monolithically integrated with a sensor element.

7. The circuit of claim 1, wherein the memory element is a Zener-zapping component.

* * * * *

UNITED STATES PATENT AND TRADEMARK OFFICE
CERTIFICATE OF CORRECTION

PATENT NO.     : 6,486,648 B1
DATED          : November 26, 2002
INVENTOR(S)    : Leo Tanten et al.

It is certified that error appears in the above-identified patent and that said Letters Patent is hereby corrected as shown below:

<u>Column 1,</u>
Between lines 8 and 9, insert -- BACKGROUND INFORMATION --.
Line 9, before "Sensor," insert -- Conventional sensor --.

Signed and Sealed this

Ninth Day of September, 2003

JAMES E. ROGAN
*Director of the United States Patent and Trademark Office*